United States Patent
Matias et al.

(10) Patent No.: US 7,967,505 B2
(45) Date of Patent: Jun. 28, 2011

(54) SENSOR DEVICE

(75) Inventors: Javier Arrimadas Matias, Deutschlandsberg (AT); Gerald Kloiber, Feldkirchen (AT); Ralf Thomas Mayer, St. Martin i. s. (AT)

(73) Assignee: EPCOS AG, Munich (DE)

( * ) Notice: Subject to any disclaimer, the term of this patent is extended or adjusted under 35 U.S.C. 154(b) by 405 days.

(21) Appl. No.: 11/575,623

(22) PCT Filed: Sep. 28, 2005

(86) PCT No.: PCT/DE2005/001726
§ 371 (c)(1),
(2), (4) Date: Jun. 29, 2007

(87) PCT Pub. No.: WO2006/034700
PCT Pub. Date: Apr. 6, 2006

(65) Prior Publication Data
US 2008/0056331 A1    Mar. 6, 2008

(30) Foreign Application Priority Data

Sep. 30, 2004   (DE) .................. 10 2004 047 725

(51) Int. Cl.
*G01K 7/00*    (2006.01)
(52) U.S. Cl. ........................ 374/183; 374/185
(58) Field of Classification Search ............. 374/185, 374/183
See application file for complete search history.

(56) References Cited

U.S. PATENT DOCUMENTS

| | | | |
|---|---|---|---|
| 4,317,367 A | 3/1982 | Schonberger | |
| 5,181,007 A | 1/1993 | Friese et al. | |
| 5,406,246 A * | 4/1995 | Friese et al. | 338/22 R |
| 5,473,304 A * | 12/1995 | Friese et al. | 338/23 |
| 5,823,680 A * | 10/1998 | Kato et al. | 374/185 |
| 6,431,750 B1 | 8/2002 | Haberbusch | |
| 6,588,931 B2 | 7/2003 | Betzner et al. | |
| 7,233,226 B2 * | 6/2007 | Zitzmann | 338/25 |
| 7,339,455 B2 * | 3/2008 | Fujita et al. | 338/25 |
| 7,441,950 B2 * | 10/2008 | Kamiyama et al. | 374/185 |
| 2004/0086026 A1* | 5/2004 | Miki et al. | 374/183 |
| 2009/0135882 A1* | 5/2009 | Kloiber et al. | 374/185 |

FOREIGN PATENT DOCUMENTS

| | | |
|---|---|---|
| DE | 37 33 192 | 10/1988 |
| DE | 10219011 | 11/2003 |
| EP | 1 418 410 | 5/2004 |
| JP | 08-068698 | 3/1996 |
| JP | 08-068699 | 3/1996 |

OTHER PUBLICATIONS

International Search Report for PCT/DE2005/001726.
Written Opinion for PCT/DE2005/001726.
English translation of IPER for PCT/DE2005/001726.
Datasheet D-FX-A, NTS Thermistor—Type FX, GE Thermometrics, Edison, NJ. (Jul. 19, 2004 or earlier).

(Continued)

*Primary Examiner* — Lisa M Caputo
*Assistant Examiner* — Mirellys Jagan
(74) *Attorney, Agent, or Firm* — Fish & Richardson P.C.

(57) ABSTRACT

A sensor device includes a flexible first film that includes structured conductive traces. The sensor device also includes a probe electrically connected to the structured conductive traces. The probe is on a first surface of the first film and connected to the first surface of the first film. The sensor device also includes a flexible second film conformally surrounding the probe and sealing the probe to the first surface of first film.

11 Claims, 2 Drawing Sheets

OTHER PUBLICATIONS

Warranty information from SeMitec/Ishizuka Electronics Corporation Catalogue 129H. (Jul. 19, 2004 or earlier).

Datasheet D-FX-A, NTC Thermistor—Type FX, GE Thermometrics, Edison, NJ. (Jul. 19, 2004 or earlier).

* cited by examiner

SENSOR DEVICE

FIELD OF THE INVENTION

A sensor device that includes, for instance, a temperature probe is disclosed.

BACKGROUND

Sensor device with surface-mountable temperature sensors are knows, for example, from the publications U.S. Pat. No. 6,588,931 B2 and U.S. Pat. No. 6,431,750 B1.

SUMMARY

A sensor device that includes a space saving probe head is disclosed.

A sensor device with a flexible first film, the first surface of which comprises structured conductive traces (electrical lead wires) is disclosed. The conductive traces are electrically connected to a probe that is arranged lying on the first surface of the first film and is mounted there. Lying as used here means that one of the largest surfaces of the probe flatly contacts the first film. The probe preferably has surface mountable external contacts, each of which is permanently connected, preferably soldered, to a conductive trace or a connection surface contacting this conductive trace and arranged on the surface of the first film.

A flexible second film that surrounds the probe conformally from above and tightly seals it to the first surface of the first film is arranged on the upper side of the first film. Thus the sensor is encapsulated in the empty space formed between the first film and the second film and is protected from environmental influences such as moisture and contamination. The arrangement has the advantage that it is possible to forgo an additional housing of the probe head formed in this manner.

The probe can consist, for instance, of a PTC or NTC ceramic (PTC=positive temperature coefficient; NTC=negative temperature coefficient). The probe preferably constitutes a flat surface-mountable component with a low height and SMD contacts (SMD=surface mounted device). The probe can also be a wired component or a component with a crimpable contact. The height of the probe is preferably less than 1 mm and can, for instance, be 100 µm. The SMD contacts of the probe are preferably arranged on its underside turned toward the first film.

The conductive traces are formed in a structured metal layer. A metal such as copper with good thermal conductivity is particularly suitable for this.

The first and/or second film can be, e.g., polyimide films, polyester imide films (PEI) films or other flexible dielectric films. It is advantageous to select the first and second film from the same material.

The first as well as the second film preferably comprise several sublayers, which together form a flexible layer composite. At least one of the sublayers is dielectric. The connection of the first and second film is advantageously an adhesive layer, which can be contained in the composite of the second layer as the lowest sublayer, for instance. One of the, preferably outer, sublayers of the first or second film can be electrically conductive and have a shielding effect against electromagnetic fields. The electromagnetic shielding of the probe and the conductive traces leading to it is of particular advantage in high-frequency applications of the sensor device, since the metallic components of the sensor device act as an antenna and, when integrated into an HF device, can capture undesired HF interface.

In one variant, the first film comprises a dielectric sublayer which is tightly connected to the structured metal layer by means of an adhesive layer, wherein the composite of the metal layer, the adhesive layer and the dielectric sublayer is flexible.

The adhesive layer, preferably viscous at room temperature, is applied between the dielectric sublayer and the surface of the first film and then cured at a high temperature, for instance, 200° C., remaining flexible even after curing.

The thickness of the first and second film, respectively, can be, for example, 25-50 µm.

In one variant, the sensor device can constitute a compact, flexible sensor component. It is also possible to integrate the sensor in an additional device such as an air conditioner.

The invention will be described in detail below on the basis of embodiments and the associated figures. The figures show various embodiments of the invention on the basis of schematic representations not drawn to scale. Identical or identically functioning parts are labeled with the same reference numbers. Schematically and in parts,

DETAILED DESCRIPTION

Figure 1:
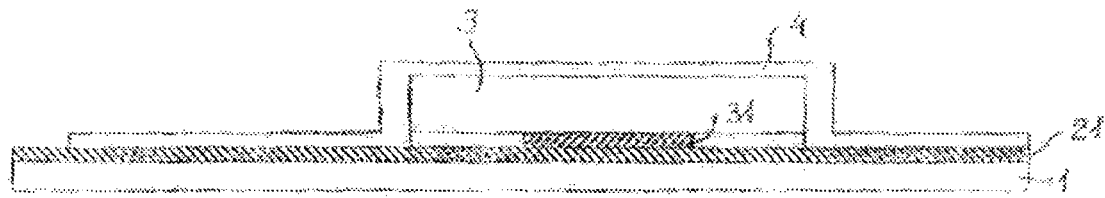
FIG. 1 shows the cross section of an example of a sensor device.
Figure 2:
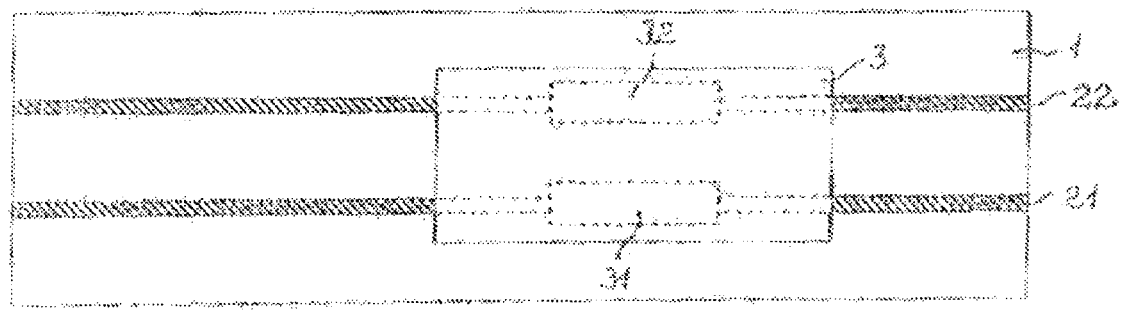
FIG. 2 shows the view of the sensor device of FIG. 1 from above.

FIGS. 1 and 2 shows various views of a first sensor device that comprises a first film 1, a metal layer arranged thereon with conductive traces 21, 22 structured in it, and a probe 3 with surface-mountable terminals 31, 32 arranged on its underside. A second film 4, which also contacts the side surfaces of the probe and seals tightly to the upper side of the film 1 on all sides, is laminated onto the back side of the probe 3. Second film 4 also covers conductive traces 21, 22, which are connected to probe 3.

Figure 3:
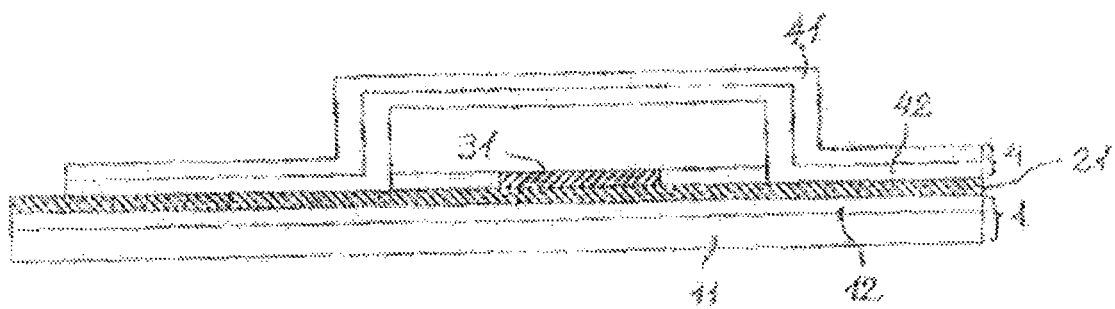
FIG. 3 shows the cross section of an additional sensor device, in which the first and the second film comprise several layers.

First film 1 comprises a dielectric layer, for instance, sublayer 11 in FIG. 3 and is, for example, a Cu-clad polyimide film, the etched copper layer being firmly connected to the polyimide film by means of, for example, an adhesive layer 12 shown in FIG. 3. Sublayers 11, 12 together form a flexible composite.

Second film 4 comprises a dielectric layer such as a sublayer 41 in FIG. 3. An adhesive layer 42, which assures the adhesion between sublayer 41 and the upper side of first film 1 or the surface of probe 3 facing film 4, is arranged on the underside of sublayer 41. Sublayers 41, 42 together form a flexible composite.

In FIGS. 1 and 3, the structural metal layer with conductive traces 21, 22 is arranged on the upper side of first film 1. A variant is presented in FIG. 4, in which the structural metal layer is arranged between two dielectric layers 11 and 13. Thus the two lead wires 21, 22 leading to the probe are buried in the interior of first film 1. Buried conductive traces 21, 22 can be contacted from the outside via vertical electrical connections, interlayer contacts 5. Interlayer contacts 5 are tightly connected to the external terminals 31, 32 of probe 3.

Figure 4:
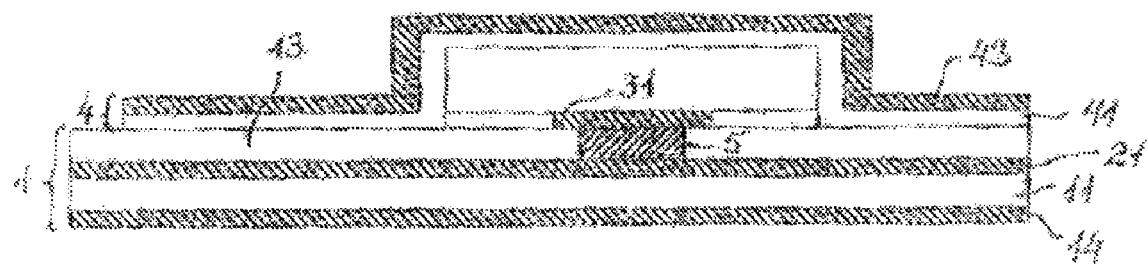
FIG. 4 show the cross section of an additional sensor device with conductive traces buried in the first film and with shielding sublayers.

In the variant shown in FIG. 4, the uppermost or outward-facing sublayer of second film 4 is formed by an electromagnetically shielding sublayer 43, for example, a copper layer. The lowermost or outward-facing sublayer of first film 1 is formed by an electromagnetically shielding sublayer 14, for example, a copper layer.

Figure 5:
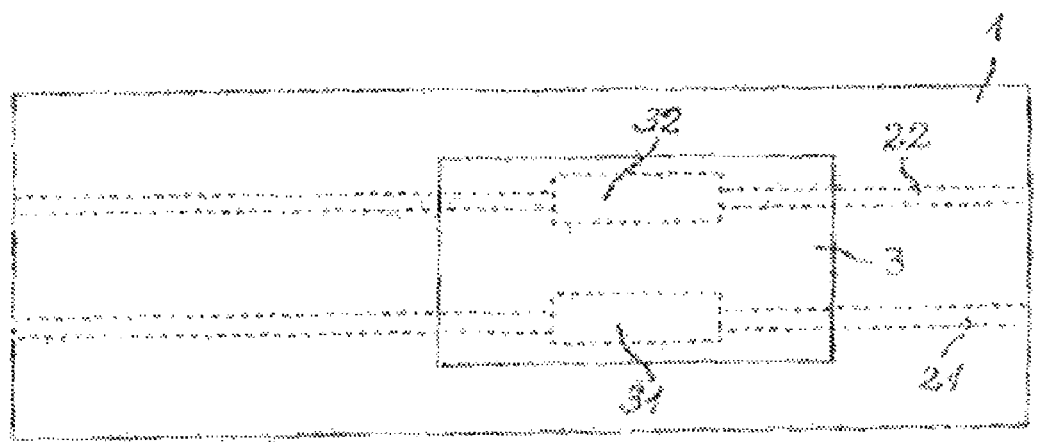
FIG. 5 shows the view of the sensor device according to FIG. 4 from above.

The plan view onto the sensor device shown in FIG. 4 can be seen in FIG. 5. Buried conductive traces 21, 22 as well as the external terminals 31, 32 of probe 3 are represented by dashed lines.

Although it was only possible to describe the invention on the basis of a few embodiments, it is not limited thereto. The elements of different embodiments can be arbitrarily combined with one another. Basically, any suitable materials or material composites as well as arbitrary layer thickness of individual sublayers of the overall structure can be used.

The invention claimed is:

1. A sensor device, comprising:
   a flexible first film comprising:
      a plurality of sublayers; and
      structured conductive traces in a structured metal layer between two dielectric layers of the sublayers;
   a probe electrically connected to the structured conductive traces, the probe being on a first surface of the first film and attached to the first surface of the first film; and
   a flexible second film conformally surrounding the probe and sealing the probe to the first surface of first film;
   wherein one or more interlayer contacts are in at least one of the dielectric layers for contacting the conductive traces, the one or more interlayer contacts being vertical electrical connections with respect to the at least one dielectric layer.

2. The sensor device of claim 1, wherein a sublayer of the plurality of sublayers of the first film comprises an electromagnetic shielding layer.

3. The sensor device of claim 1, wherein the second film comprises a plurality of sublayers.

4. The sensor device of claim 3, wherein a sublayer of the plurality of sublayers of the second film facing the first film comprises an adhesive layer.

5. The sensor device of claim 3,
   wherein a sublayer of the plurality of sublayers of the second film comprises an electromagnetic shielding layer.

6. The sensor device of claim 1, wherein the probe comprises a temperature sensor.

7. The sensor device of claim 6, wherein the probe comprises a surface-mountable thermistor, the surface-mountable thermistor comprising external contacts facing the first surface of the first film.

8. The sensor device of claim 6, wherein the probe comprises a wired thermistor.

9. The sensor device of claim 6, wherein the probe comprises a crimpable contact.

10. A sensor device, comprising:
    a flexible first film comprising:
       a plurality of sublayers; and
       structured conductive traces in a structured metal layer between two dielectric layers of the sublayers;
    a probe electrically connected to the structured conductive traces, the probe being on a first surface of the first film and attached to the first surface of the first film; and
    a flexible second film conformally surrounding the probe and sealing the probe to the first surface of first film;
    wherein one or more interlayer contacts are in at least one of the dielectric layers for contacting the conductive traces, the at least one of the dielectric layers being arranged between at least a portion of the probe and a portion of each of the structured conductive traces.

11. A sensor device, comprising:
    a flexible first film comprising:
       a plurality of sublayers; and
       structured conductive traces in a structured metal layer between two dielectric layers of the sublayers;
    a probe electrically connected to the structured conductive traces, the probe being on a first surface of the first film and attached to the first surface of the first film; and
    a flexible second film conformally surrounding the probe and sealing the probe to the first surface of first film;
    wherein one or more interlayer contacts are in at least one of the dielectric layers for contacting the conductive traces, the one or more interlayer contacts being vertical electrical connections with respect to the dielectric layers; and
    wherein the dielectric layers comprise polyimide films or polyether imide films.

* * * * *